(12) United States Patent  
Tochio et al.

(10) Patent No.: US 7,255,139 B2  
(45) Date of Patent: Aug. 14, 2007

(54) POWDER LEVELING METHOD AND POWDER LEVELING APPARATUS

(75) Inventors: Toshiharu Tochio, Gunma (JP); Takeo Nagata, Gunma (JP)

(73) Assignee: Nisshinbo Industries, Inc, Tokyo (JP)

( * ) Notice: Subject to any disclaimer, the term of this patent is extended or adjusted under 35 U.S.C. 154(b) by 135 days.

(21) Appl. No.: 11/065,190

(22) Filed: Feb. 24, 2005

(65) Prior Publication Data

US 2005/0199036 A1     Sep. 15, 2005

(30) Foreign Application Priority Data

Mar. 3, 2004    (JP) ............................. 2004-058829

(51) Int. Cl.
 *B65B 1/04*     (2006.01)
(52) U.S. Cl. ....................... 141/125; 141/67
(58) Field of Classification Search ............ 141/1, 141/67, 98, 284, 250, 279, 280, 125; 264/238; 425/110, 317, 447

See application file for complete search history.

(56) References Cited

U.S. PATENT DOCUMENTS 5,647,410 A * 7/1997 Nakagawa et al. ........... 141/67

FOREIGN PATENT DOCUMENTS

JP            11-226979          8/1999

* cited by examiner

*Primary Examiner*—Steven O. Douglas  
(74) *Attorney, Agent, or Firm*—Muramatsu & Associates

(57) ABSTRACT

A powder leveling method and apparatus conducts leveling a thin layer of powder containing fiber to a uniform thickness so as to form friction material having a multi-layered structure. A cavity of predetermined shape having an opening in a flat surface is filled with powder containing fiber so that the powder overflows the opening of the cavity in the flat surface. A cylindrical leveling device is moved in a first direction across the cavity and then in a second direction intersecting with the first direction at a speed greater than the speed with which the leveling device moves in the first direction, so as to trim away the excess powder and make the power in the opening flush with the flat surface.

13 Claims, 8 Drawing Sheets

POWDER LEVELING METHOD AND POWDER LEVELING APPARATUS

BACKGROUND OF THE INVENTION

1. Field of the Invention

The present invention relates to a leveling apparatus that measures a predetermined amount of powder, and more particularly, to a measurement method and a leveling apparatus suitable for powder used in a method for manufacturing friction material such as disc pads, brake linings, and clutch facings.

2. Description of the Related Art

Brake linings, clutch facings and the like are affixed to a brake shoe and a clutch disc, respectively, by an adhesive agent, rivets, or the like. Of these, some, like a disc pad, are made by attaching a metal plate called a back plate to the friction material by thermocompression molding.

The friction material is formed by filling a thermocompression mold with powdered friction raw material, composed of a mixture of fiber, filler, binder and the like and heating and compressing it with a press machine (hereinafter "press"). There are two such methods of forming the friction material. One method involves directly filling the thermocompression mold with the powdered friction raw material and molding it by pressing it with a press. The other method involves filling the compression mold with the powdered friction raw material and compressing it with a press without heating to form a preform. The preform is then put into a separate thermocompression mold and heated and pressed with a press. In a disc pad, the back plate overlays the powdered friction raw material and is heated and pressed so as to adhere the back plate to the friction material.

Although the above-described friction material may be a single layer composed of a single composition, it is not uncommon for the friction material to be of two- or a multi-layer construction. In disk pads in particular, in order to obtain adequate strength of adhesion and shearing strength between the back plate and the friction material, as well as both adequate heat insulation to retard the propagation of heat from the friction surface of the friction material to the back plate and adequate vibration absorption in order to prevent the occurrence of screeching, an intermediate layer composed of a material that behaves differently from the friction layer is often provided between the friction layer that acts as a brake and the back plate.

In the conventional multi-layer friction material structure having two or more layers, the weight of both the raw material for the substantially powdered friction layer and the raw material for the substantially powdered intermediate layer, respectively, is measured, and as an initial step the raw material for the intermediate layer is spread to a uniform thickness inside a compression mold, after which the raw material for the friction layer is spread atop the raw material for the intermediate layer. The layers are then compressed with a press to form a preform. Where the step of creating a preform is not taken, a thermocompression mold is filled with the friction layer raw material and the intermediate layer raw material, the back plate is directly contacted against the material and the whole is heated and compressed by the press to form a finished product.

However, with the above-described conventional method, because the powdered raw material for forming the intermediate layer is measured by weight and a given weight is either manually or mechanically spread to a uniform thickness inside the mold, it is easy for the thickness of the layer to be or become uneven. Typically, in contrast to the thickness of the friction material, which is approximately 10 mm, the thickness of the intermediate layer is approximately 1-2 mm. Given such thinness, any unevenness in the thickness of the intermediate layer can produce local deficiencies in that thickness, which in turn can give rise to insufficient adhesive strength, shearing strength, heat insulation, and vibration absorption. Consequently, conventionally, in part because it had been impossible to give the intermediate layer a uniform thickness, the intermediate layer has been made extra thick, so that, even if local thinness dose arise, there is no loss of the adhesive strength, shearing strength, heat insulation and vibration absorption properties described above.

However, such an approach, while solving the problem of the intermediate layer material only slightly, leads to the opposite problem of localized thickness of the intermediate layer, in other words, too much material. Where too thick, the intermediate layer becomes exposed extremely quickly once the friction material wears away, leading to localized deterioration in friction performance such as degradation of the coefficient of friction, wear, and fade resistance.

Thus, as described above, where the friction material consists of a multi-layer structure, it is very difficult to make the thickness of the layers uniform.

In order to overcome this drawback, Japanese Laid-Open Patent Publication No. 11-226979 proposes a friction material manufacturing apparatus like that shown in FIG. 14. That is, in FIG. 14, a slide plate 3 having a cavity 3a of a uniform depth is disposed so as to be horizontally slidable between a plunger 2 and a fixed mold 5 and a hopper 6 for intermediate layer raw material is provided near a frame 1, with an exit aperture 6a contacting the slide plate 3.

The slide plate 3 itself is disposed so as to contact a bottom edge 1b of the frame 1. A cavity 3a of the same shape as the friction material is provided in the shape of an aperture penetrating the slide plate 3, with the bottom of the hole covered by a bottom plate 4. Both the slide plate 3 and the bottom plate 4 can be moved in the horizontal direction. When the cavity 3a is positioned directly beneath the frame 1, the bottom plate 4 rests atop the fixed mold 5. A small cavity 4a corresponding to the boss of a preform is formed in the bottom plate 4. The slide plate 3 and the bottom plate 4 break apart into two parts along an imaginary line that passes through the center of the small cavity 4a.

When the slide plate 3 moves horizontally and the cavity 3a comes under the hopper 6, the cavity 3a and the small cavity 4a are filled with intermediate layer raw material 8. When the slide plate 3 returns to its position beneath the frame 1, the surface of the bottom edge 6b of the hopper 6 becomes a leveling plate that makes the thickness of the intermediate layer raw material 8 uniform. When the cavity 3a returns to a position beneath a cavity 1a in the frame 1, a certain amount of friction layer raw material 9 enters the empty space 1a from above and is made a uniform thickness, after which the plunger 2 descends and compresses the layers of material to form a structure. By using multiple slide plates 3 and filing a different hopper with more powdered intermediate layer raw material, a multi-layered structure can be obtained.

It is desirable that as much fibrous material as possible be mixed into the intermediate layer in order to increase the strength of adhesion and shearing strength between the back plate and the friction material. However, with the apparatus described in Japanese Laid-Open Patent Publication No. 11-226979, there is a limit to the amount of fiber that can be mixed into the intermediate layer. The intermediate layer has a thickness of approximately 1 mm when formed by thermocompression and the cavity 3a has a depth of approximately only several millimeters. If a large amount of fibrous material is mixed into the intermediate layer raw material, then when leveled by the surface of the bottom edge 6b of the hopper 6 as shown in FIG. 14 the intermediate layer raw material cannot be leveled cleanly because the fibers that contact the surface of the bottom edge 6b of the hopper 6 are pulled along by the edge of the surface of the bottom edge 6b, which in turn appears to cause a substantial amount of powdered raw material to be pulled along therewith. As a result, when leveling is finished, there arises a situation in that in some areas there is absolutely no powdered raw material at all, the leveled surface is not flush, and there are bumps and depressions. If the intermediate layer is exposed to thermocompression molding in this state, the result will be an uneven intermediate layer and/or friction material with no intermediate layer backing.

SUMMARY OF THE INVENTION

Accordingly, the present invention is conceived as a solution to the above-described situation, and has as its object to provide a powder leveling method and apparatus that can trim a thin layer of powder containing fiber to a uniform thickness, and is capable of forming friction material into a multi-layer structure.

To achieve the above-described object of the present invention, there is provided a powder leveling method comprising the steps of:

filling a cavity of predetermined shape with an opening in a flat surface with powder containing fiber so that the powder overflows the opening of the empty space in the flat surface;

leveling a heap of powder by moving a leveling means of which at least an edge portion of a bottom edge surface thereof is roughened in a first direction of movement over the empty space; and leveling the powder by moving the leveling means in a second direction of movement intersecting to the first direction of movement, at a speed greater than a speed with which the leveling means moves in the first direction of movement.

In addition, to achieve the above-described object of the present invention, there is also provided a powder leveling apparatus comprising:

a frame enclosing a cavity of a predetermined shape with an opening in a flat surface of the frame so that the powder overflows the opening of the empty space in the flat surface;

leveling means of which at least an edge portion of a bottom edge surface thereof is roughened so as to trim flush with the flat surface the powder filled into the empty space by moving the leveling means relative to the frame;

first movement means for leveling the powder by moving the leveling means or the frame in a first direction of movement over the empty space; and second movement means for leveling the powder by moving the leveling means or the frame in a second direction of movement intersecting to the first direction of movement, at a speed greater than a speed with which the leveling means or the frame move in the first direction of movement.

According to the invention described above, when the empty space is filled to overflowing with powder and is leveled by the leveling means, since the leveling means having a roughness on at least an edge portion of a lower edge surface thereof moves in a first direction as well as more quickly in a second direction intersecting with the first direction, when fibrous material caught on the edge portion of the bottom edge surface attempts to drag powdered raw material, the leveling means can trim while cutting through the fibrous material and stopping the dragging of the powdered raw material. Therefore, the powdered raw material is not dragged by the fiber and the powder can be leveled smoothly, that is, without unevenness, and flush with the flat surface.

Preferably, the leveling means is provided with a cylinder having a central axis perpendicular to the flat surface;

a bottom edge surface of the cylinder slides over the flat surface; and the second direction of movement is rotation of the cylinder about its axis.

According to the invention described above, a cylinder is used in the leveling means, and therefore movement in a second direction can be added simply by rotating the cylinder to enable leveling away of excess powder with ease.

Preferably, the inner diameter of the cylinder is greater than the empty space.

According to the invention described above, making the inner diameter of the cylinder greater than the empty space enables leveling to commence when the empty space enters the cylinder. As a result, excess powder can be held within the cylinder, without scattering, thus making collection unnecessary.

Preferably, the vibrator is provided on the leveling means and the second direction of movement is a reciprocal sliding of the vibrator over the flat surface.

Preferably, the leveling means is provided with a continuous belt, such that by rotation of the continuous belt one edge of the belt slides over the flat surface to achieve the second direction of movement.

Preferably, the leveling means is a continuous line wound continuously between two separated pulleys and the second direction of movement involves rotating the continuous line about a hypothetical line connecting centers of the two pulleys while sliding the continuous line over the flat surface by rotating the two pulleys.

According to the invention described above, a vibrator, belt or line can be used as the leveling means, such that scattering of the powder can be reduced.

Preferably, the leveling means comprises a cylinder having a central axis perpendicular to the flat surface and a disk inside the cylinder having an eccentric aperture therein, the disk sliding over the flat surface, the disk rotatable with the cylinder and movable within the cylinder a predetermined distance along the central axis of the cylinder.

According to the invention described above, by providing the cylinder with an axis of rotation perpendicular to the flat surface and a disk disposed within the cylinder that slides over the flat surface and in which is formed an eccentric aperture, the disk can be made to rotate together with the cylinder and to move a predetermined distance in the direction of the axis of rotation inside the cylinder, and thus excess powder can be swept away by the periphery of the eccentric aperture and held within the cylinder, making collection unnecessary.

Preferably, the central axis of the cylinder and the axis of rotation of the motor are eccentric.

According to the invention described above, by making the central axis of the cylinder and the axis of rotation of the motor eccentric, the direction of the second direction of movement is changed periodically, enabling powder to be leveled efficiently.

Preferably, the frame comprises press molding apparatus frame molds and a lower mold movable between and relative to the frame molds, with the depth of the empty space being adjustable by changing the relative height of the frame molds and the lower mold.

According to the structure described above, the leveling apparatus of the present invention can be easily adapted to a press molding apparatus used to form friction material, thereby enabling the manufacture with ease of friction material having a multi-layer structure in which the layers are of uniform thickness.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 8A and 8B are diagrams showing a powder leveling apparatus according to a third embodiment of the present invention, in which FIG. 8A shows a plan view thereof and FIG. 8B shows a cross-section view thereof along a line B-B;

DETAILED DESCRIPTION OF THE PREFERRED EMBODIMENTS

Preferred embodiments of the present invention will now be described in detail in accordance with the accompanying drawings.

Figure 1:
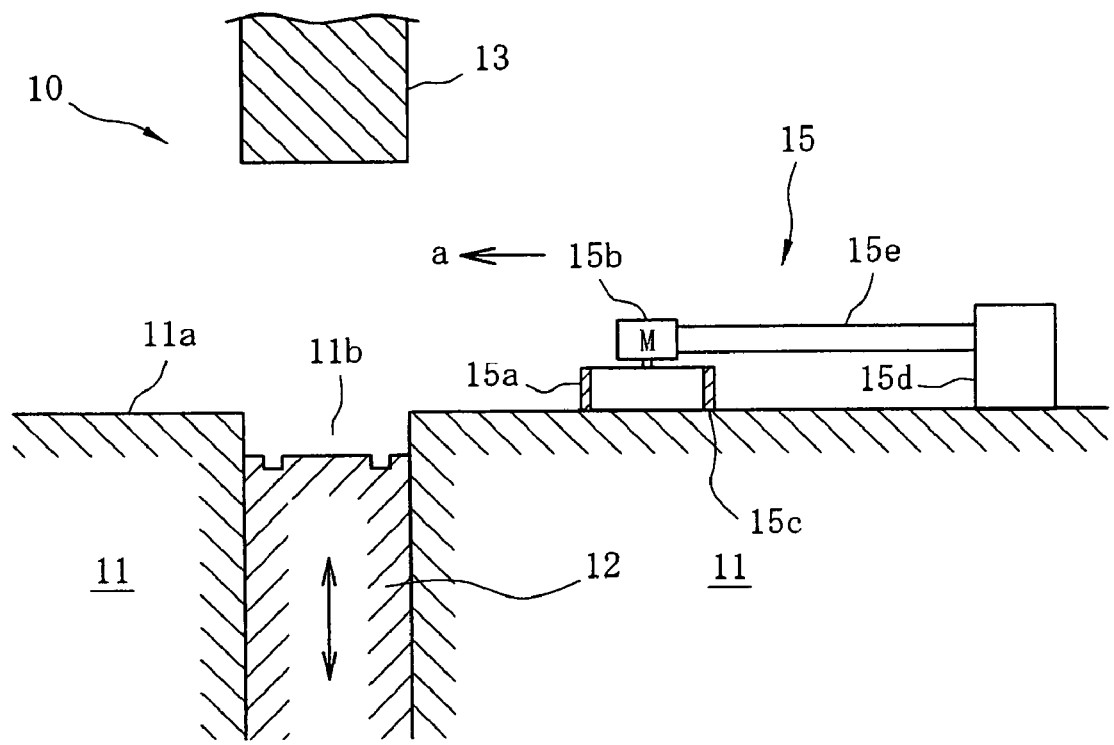
FIG. 1 is a diagram showing a longitudinal cross-sectional view of a press apparatus, in which a powder leveling apparatus is adapted to a press device as a machine for the manufacture of friction material, according to a first embodiment of the present invention.
Figure 2:
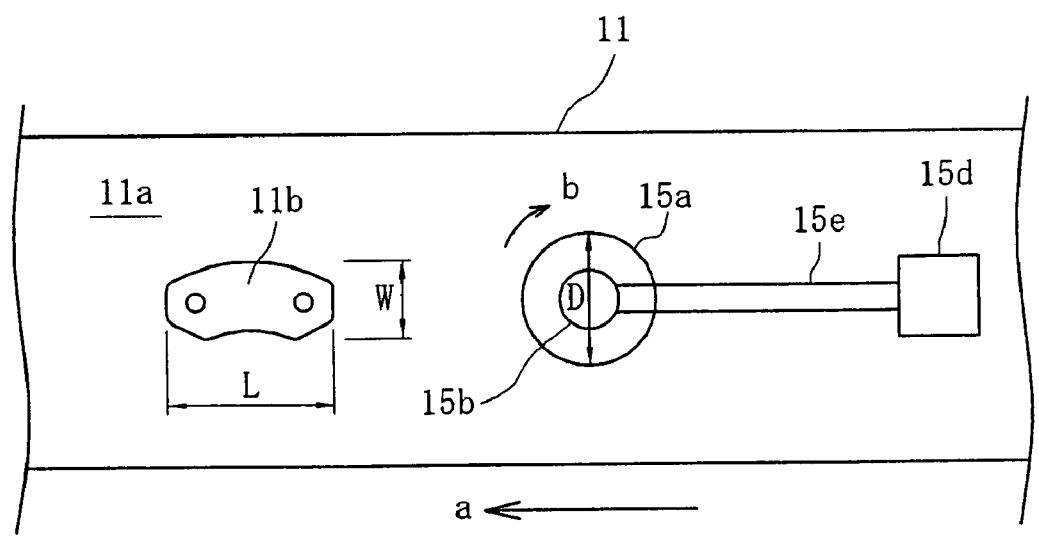
FIG. 2 is a diagram showing a plan view of the apparatus shown in FIG. 1, with the upper mold removed.

FIG. 1 is a diagram showing a longitudinal cross-sectional view of a press apparatus, in which a powder leveling apparatus is adapted to a press device as a machine for the manufacture of friction material, according to a first embodiment of the present invention. FIG. 2 is a diagram showing a plan view of the apparatus shown in FIG. 1, with the upper mold removed. A press 10 forms a preform of friction material.

In the diagrams, the frame molds 11, which act as a frame, are provided with an empty space 11b in the center of a flat top surface 11a thereof. As shown in FIG. 2, the empty space 11b has the same shape as the preform.

Inside the frame molds 11 there is a lower mold 12. The lower mold 12 can ascend and descend within and relative to the frame molds 11, and can be stopped at any position within the empty space 11b.

Above the frame molds 11 there is an upper mold 13. The upper mold 13 can also ascend and descend within and relative to the frame molds 11. Inside the empty space 11b in the frame molds 11, and between the lower mold 12 and the upper mold 13, pressure is applied to powdered friction material to form a preform.

Up to this point, the friction material production apparatus is the same as the conventional art. What is distinctive about the present invention is the addition of a leveling means 15.

The leveling means 15 is slidably disposed atop the flat top surface 11a of the frame molds 11. A hollow cylinder 15a thereof is rotated in a direction indicated by arrow b in FIG. 2 by a motor 15b. The cylinder 15a is provided with a rough edge on at least a surface of a bottom edge 15c thereof. In other words, either the entire surface of the bottom edge 15c is a rough surface or the surface of the bottom edge 15c is smooth and only the edge thereof is rough. The cylinder 15a may be made of any material used in buffing having a rough surface of, for example, hard foamed polyurethane.

As can be understood by those of ordinary skill in the art, although in the embodiment shown in the diagram the cylinder 15a of the leveling means 15 is hollow, the cylinder 15a is not limited to such a construction and therefore may, alternatively, be solid. However, a solid construction increases the surface area that contacts the powder, and therefore a hollow construction can be said to be preferable. If the outer diameter D of the cylinder 15a is made greater than the minor axis W of the empty space 11b, then the leveling means 15 will not fall into the empty space 11b even if the leveling means 15 is smaller than the major axis L of the empty space 11b.

The cylinder 15a and the motor 15b are coupled to each other by a moving means 15d fixedly mounted on the frame molds 11, for example, and by a rod 15e. The exact structure of the coupling is not limited ti this arrangement, and thus, for example, a screw shaft may be used, or a rack and pinion arrangement, or a pneumatic cylinder or hydraulic cylinder may be used as well.

In the above-described construction and in the following description, the direction indicated by arrow a is a first direction, the moving means 15d is a first-direction moving means, the direction indicated by arrow b is a second direction, and the motor 15b is a second-direction moving means.

Figure 3:
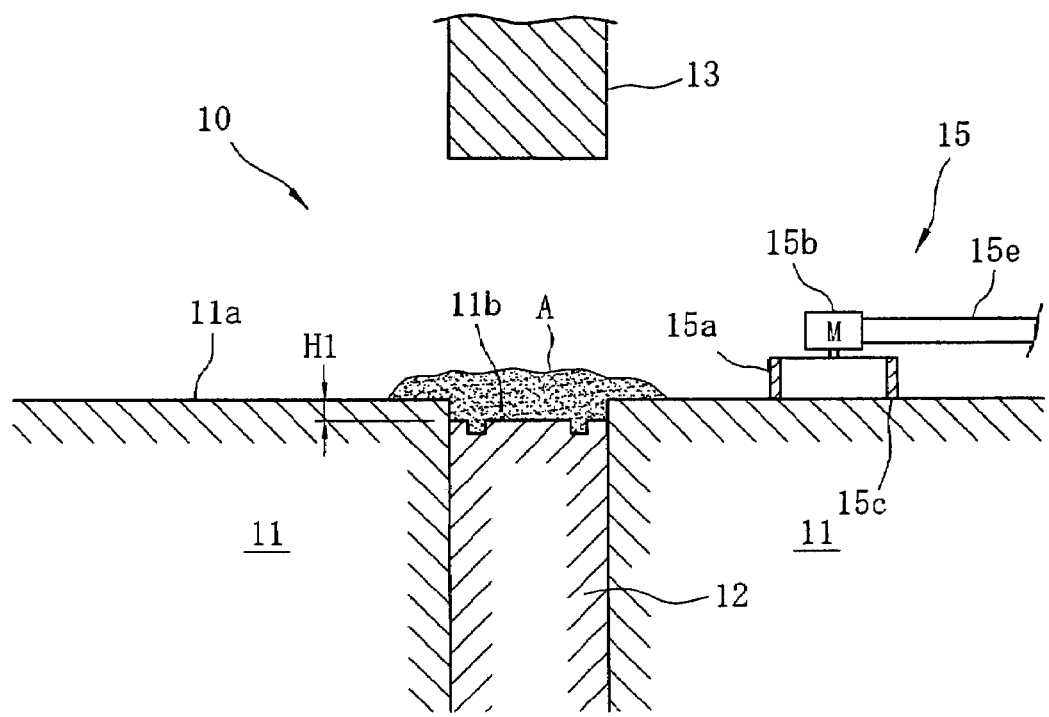
FIG. 3 is a diagram showing a state in which the empty space is filled with a heap of powder for forming an intermediate layer.
Figure 4:
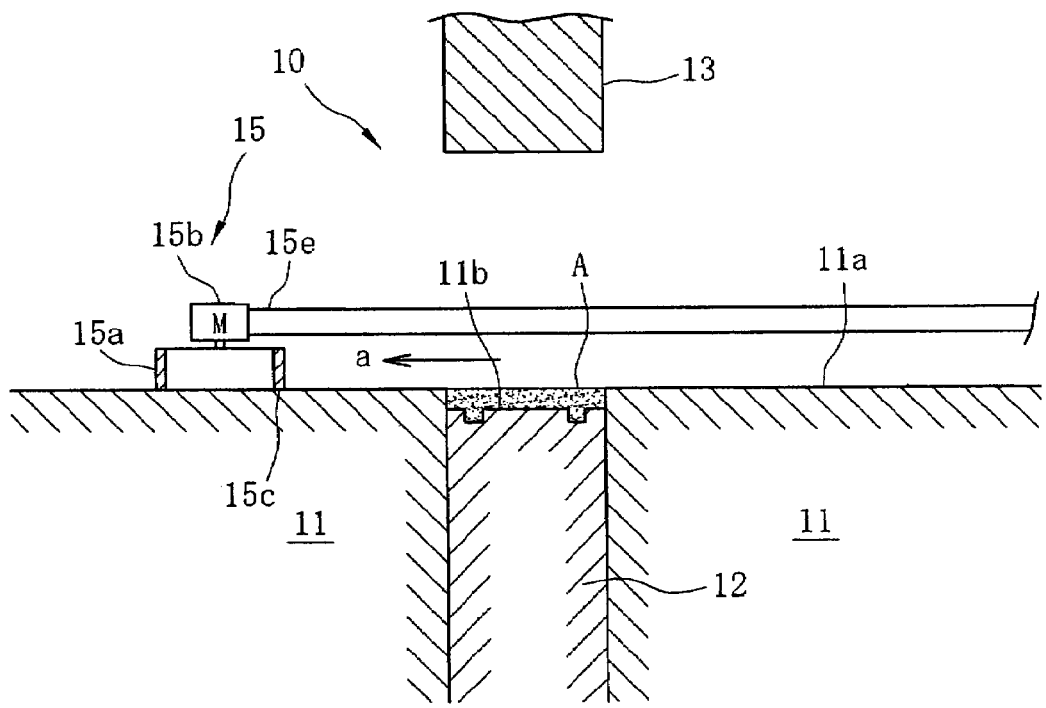
FIG. 4 is a diagram showing a state in which the powder in the empty space is leveled flush.

Next, a description will be given of a method of measuring powder A by the press 10, such powder A being the raw material for the friction material. FIG. 3 is a diagram showing a state in which the empty space 11b is filled with the powder A for forming the intermediate layer. FIG. 4 is a diagram showing a state in which the powder A in the empty space 11b is leveled.

As shown in FIG. 3, the lower mold 12 is stopped at an upper part of the empty space 11b. The depth H1 of the empty space 11b is several millimeters. In the present invention, the depth is 6 mm. Moreover, as shown in FIG. 2, the empty space 11b has a length L of 100 mm and a width W of 50 mm, and the cylinder 15a has a diameter D of 200 mm and a thickness of 10 mm. As can be appreciated by those of ordinary skill in the art, these dimensions are purely illustrative and constitute merely one embodiment, and accordingly, the present invention is not limited thereto.

The empty space 11b is filled with the powder A so as to overflow the space, as shown in FIG. 3. The powder A forms the intermediate layer of the friction material. In order to increase the strength of the adhesion and the shearing strength between the friction material and the back plate, the powder A that will become the intermediate layer contains at least 4 percent by volume fiber having a length of at least 500 μm. The fiber may be organic fiber, inorganic fiber, or metallic fiber. Any variety of synthetic fiber may be used for the organic fiber. For the inorganic fiber, glass fiber, rock wool and the like may be used. Steel, copper or the like may be used for the metallic fiber.

Once the empty space 11b is filled with the powder A so as to overflow the space, the cylinder 15a of the leveling means 15 is rotated at 300 rpm, and slid over the flat surface 11a in the first direction a shown in FIG. 4 at a speed of 30 mm/sec so as to pass over the empty space 11b and thus trim the heap of powder A flush with the flat surface 11a. The linear speed of the cylinder 15a is approximately 3100 mm/sec in a second direction b substantially perpendicular to the first direction a, or at least 100 times the 30 mm/sec speed of the cylinder 15a in the first direction a.

It should be noted that although in the present embodiment the second direction b is substantially perpendicular to the first direction a, the invention is not limited to such an arrangement and there is no particular limitation on the angle at which the second direction b intersects with the first direction a.

Since at least the edge of the surface of the bottom edge 15c is a rough surface, and since the cylinder 15a is moving in the second direction b at a speed greater than the speed with which it moves in the first direction a due to the rotation described above, when the edge of the bottom edge surface 15c pushes against and tries to drag the fiber material contained in the powder A, such dragging can be broken off, thus eliminating the dragging of the powdered raw material, and the cylinder 15 can pass over the empty space 11b and trim the powder A flush with the flat surface 11a. Thereafter, excess powder A is collected by a vacuum device, not shown, and reused.

Figure 5:
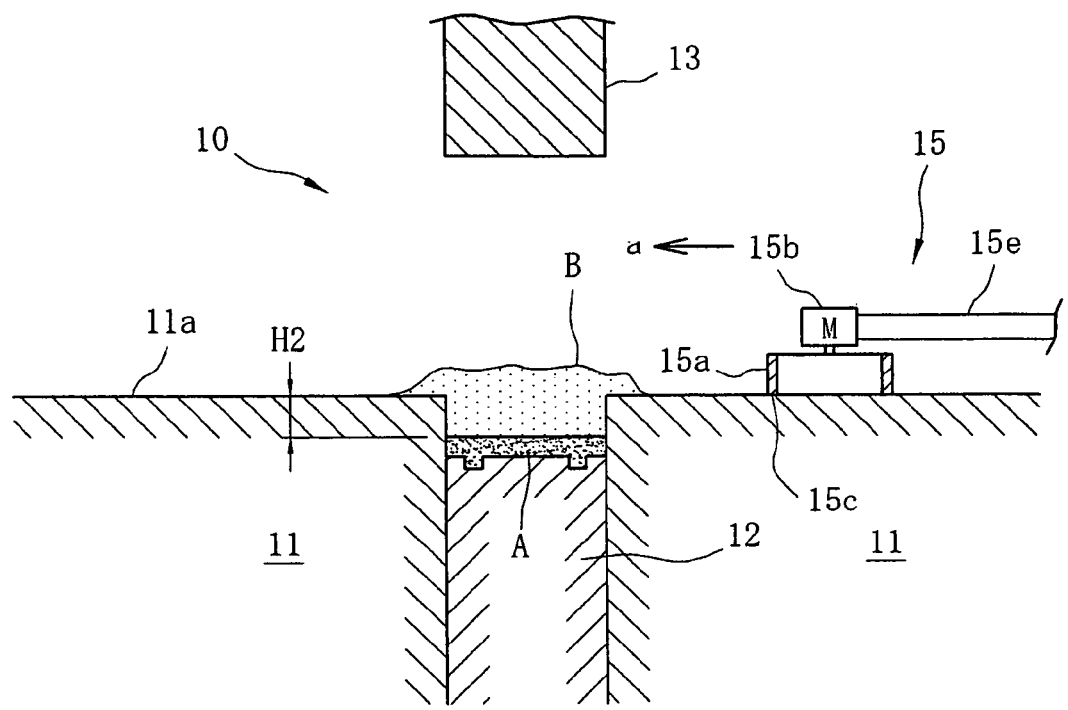
FIG. 5 is a diagram illustrating a method for overlaying the powder of the intermediate layer with powder of a friction layer to a predetermined depth.
Figure 6:
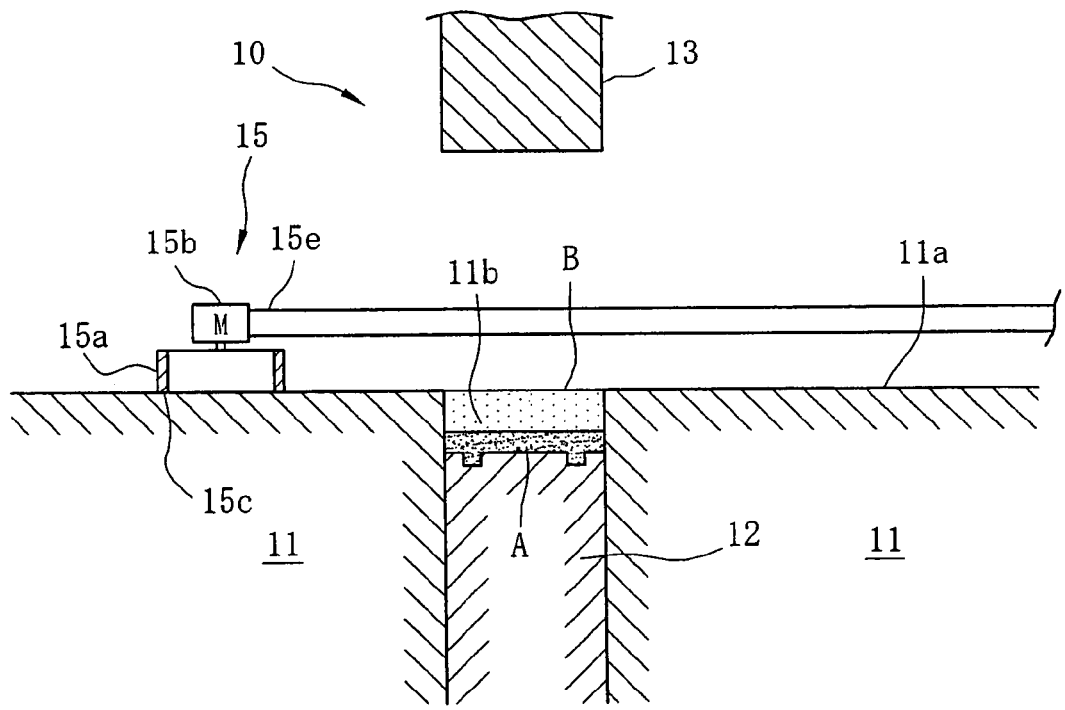
FIG. 6 is a diagram illustrating a method for overlaying the powder of the intermediate layer with powder of a friction layer to a predetermined depth and leveling the friction layer flush.

FIGS. 5 and 6 are diagrams illustrating the process for overlaying the powder of the intermediate layer with powder of a friction layer to a predetermined depth and leveling the friction layer flush. At the start, the lower mold 12 is lowered by a distance H2 (shown in FIG. 5) from the position shown in FIG. 4. The distance H2 is greater than the depth H1, being approximately 30-40 mm. The empty space 11b thus formed is then filled to overflowing with the powder B that will become the friction layer. The powder B is a composition designed to maintain performance as a friction layer.

Once the empty space 11b is filled to make a heap of the powder B, the cylinder 15a of the leveling means 15 is rotated/moved at the same rotation speed and velocity as that applied for leveling the powder A, and passed over the empty space 11b so as to trim the powder B flush with the flat surface 11a. If the leveling means 15 used to trim powder B is different from that used for leveling powder A, then mixing of powder B with powder A can be prevented. Thereafter, though not shown in the drawings, the upper mold 13 is lowered into the empty space 11b and powders A and B are compressed to form a preform consisting of two layers, an intermediate layer and a friction layer.

Although the foregoing description pertains to a two-layer construction, it applies equally well to a structure consisting of three or more layers. In addition, although in the embodiment shown the cylinder 15a rotates about a central axis, alternatively, the cylinder 15a may be given an eccentric rotation, and further, the axis of rotation may itself be circular, imparting a double rotation to the cylinder 15a.

Figure 7:
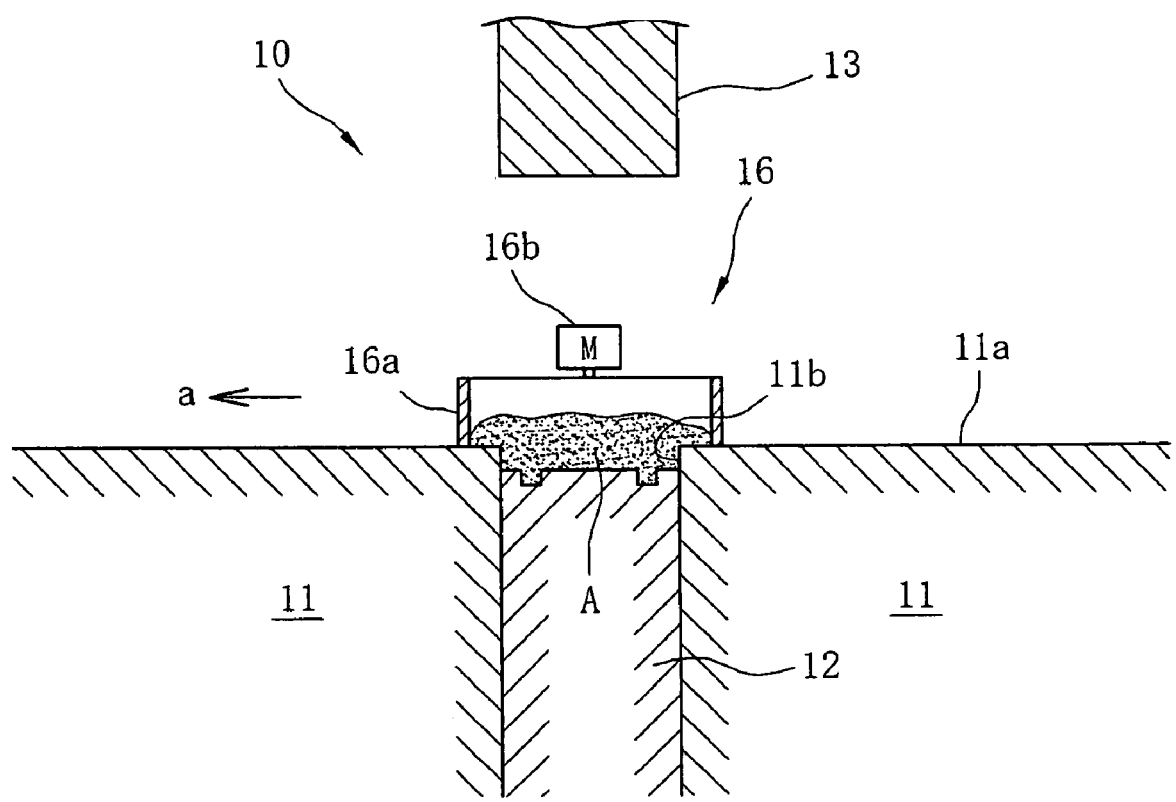
FIG. 7 is a diagram showing a powder leveling apparatus according to a second embodiment of the present invention, which prevents peripheral scattering of the powder by a rotating body during leveling of the powder.

FIG. 7 shows a second embodiment of the present invention, which prevents peripheral scattering of the powder when leveled by a rotating body. The leveling means 16 is provided with a hollow cylinder 16a and a motor 16b. The hollow cylinder 16a has an inner diameter sufficiently large to cover the empty space 11b. As shown in FIG. 3, the empty space 11b is filled to overflowing with powder A and the hollow cylinder 16a covers the powder A from the outside. When the hollow cylinder 16a is then rotated and moved in the direction indicated by arrow a, the excess powder A is moved away from the empty space 11b on the flat surface 11a in a state that the excess powder A remains inside the hollow cylinder 16a, without scattering outside the hollow cylinder 16a. Thereafter, the excess powder A removed from the empty space 11b on the flat surface 11a is collected by a vacuum or the like. Although not shown, the first-direction means 15d can be mounted as necessary.

Figure 8A:
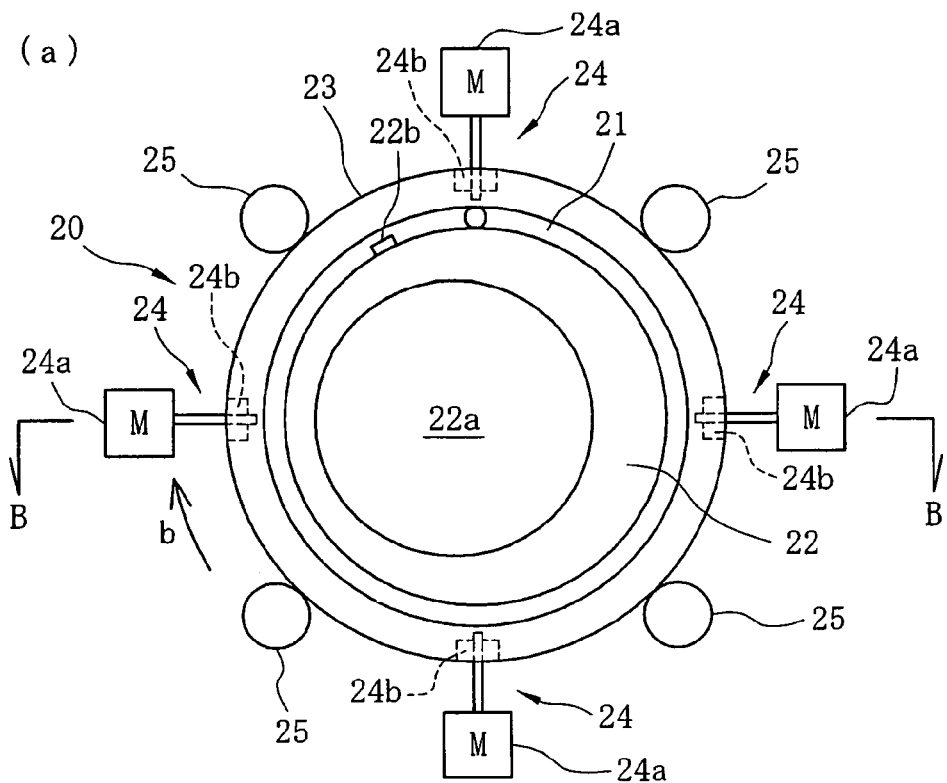
Figure 8B:
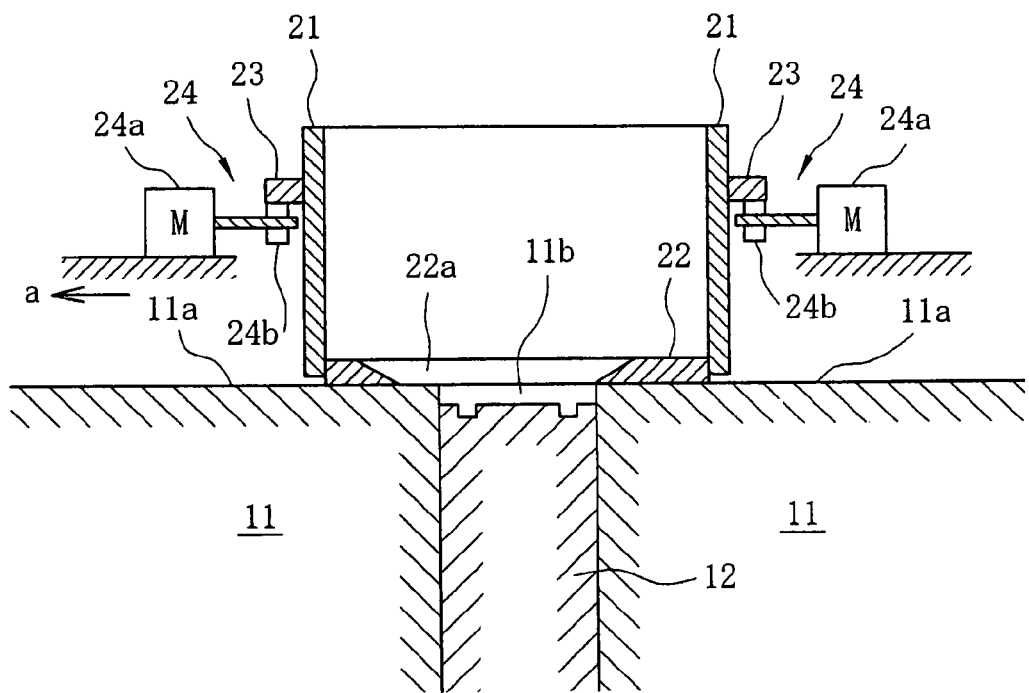

FIGS. 8A and 8B are diagrams showing a powder leveling apparatus according to a third embodiment of the present invention, in which FIG. 8A shows a plan view thereof and FIG. 8B shows a cross-section view thereof along a line B-B. The leveling means 20 of this embodiment is comprised of a cylinder 21, a disk 22 contained within the cylinder 21 that rotates with the cylinder 21, a flange 23 provided along the outside of the cylinder near a top edge thereof, four driving means 24 that support the flange 23 from below, and four guide rollers 25 that guide the rotation of the cylinder 21. The disk 22 is provided with an eccentric aperture 22a formed therein and a projection 22b extending therefrom. The projection 22b engages with a groove formed in the cylinder 21 to stop the rotation of the disk. In addition, the projection 22b moves within the groove in the cylinder 21 so as to allow the disk 22 to move in an axial direction (that is, vertically in the diagram). With such a structure, although the disk 22 rotates with the cylinder 21, the disk ascends and descends inside the cylinder 21. In this arrangement, since the cylinder 21 itself does not trim, it is preferable that a slight gap be maintained between the cylinder 21 and the flat surface 11a.

Although not shown, the leveling means 20 is provided with first-direction moving means 15d like the first embodiment shown in FIG. 1, and is similarly coupled thereto by the rod 15e. The driving means 24 are provided with second-direction moving means in the form of four motors 24a, one motor for each driving means. When the motors 24a rotate, a drive roller 24b also rotates and the flange 23 rotates in the second direction b, rotating the cylinder 21 and the disk 22 inside the cylinder 21. Since the aperture 22a formed in the disk 22 is eccentric, the powder is cut by rubbing, between an edge of the aperture 22a and a bottom surface of the disk 22. At the same time, the leveling means 20 moves in the first direction, and therefore can cut by rubbing the entire top surface of the empty space 11b. Moreover, it should be noted that although four motors 24a are shown, alternatively, one motor is sufficient and may be used instead of four.

Figure 9:
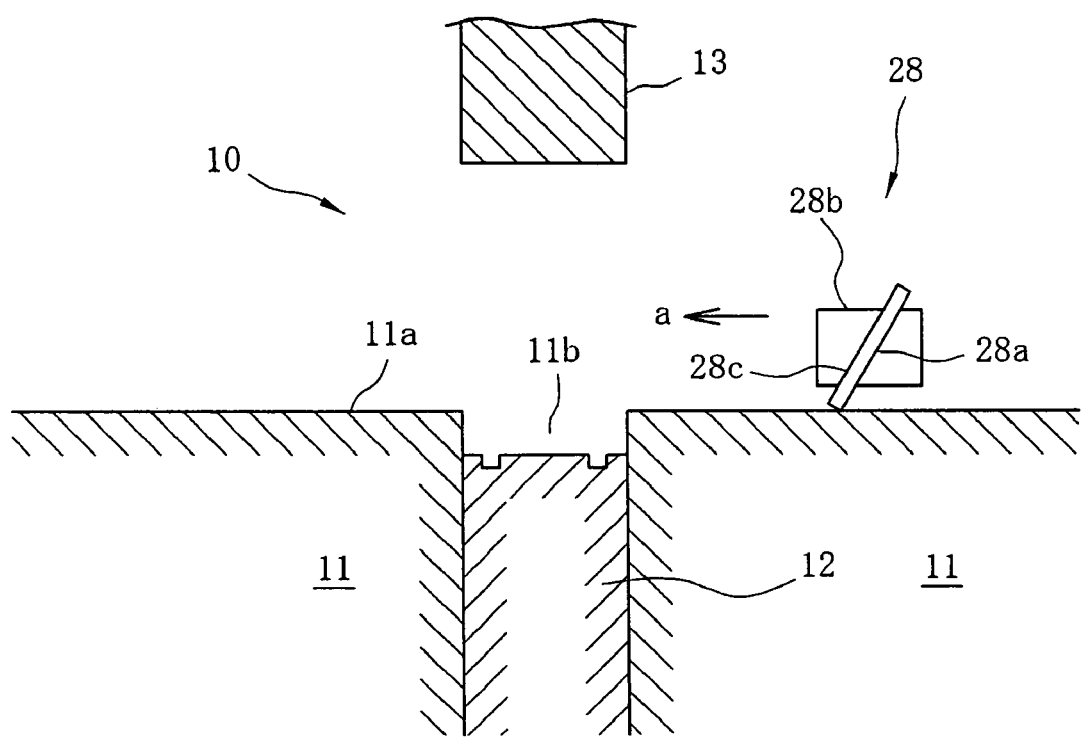
FIG. 9 is a diagram showing a longitudinal cross-sectional view of a powder leveling apparatus according to a fourth embodiment of the present invention.
Figure 10:
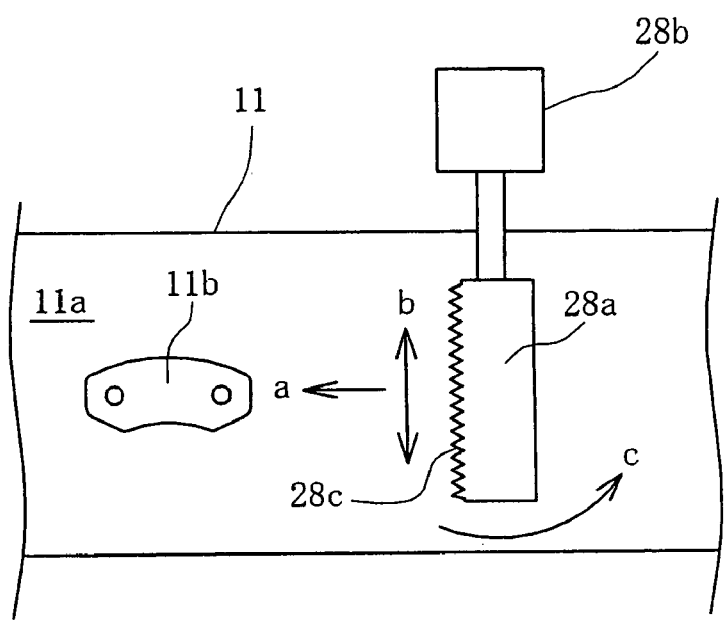
FIG. 10 is a diagram showing a plan view of the apparatus shown in FIG. 9, with the upper mold removed.

FIG. 9 and FIG. 10 are diagrams showing a powder leveling apparatus according to a fourth embodiment of the present invention, with FIG. 9 showing a longitudinal cross-sectional view thereof and FIG. 10 showing a plan view thereof from which the upper mold has been eliminated for the sake of clarity.

As described with reference to the second embodiment shown in FIG. 7 as well, the leveling means 15 shown in FIG. 1 cuts by rubbing along the outer periphery of the cylinder 15a, and consequently scatters powders A, B widely, creating the problem of lengthy collection time. The fourth embodiment solves this problem by using a reciprocating vibrator.

In other words, in FIGS. 9 and 10, the leveling apparatus 10 is comprised of leveling means 28, a vibrator 28a and driving means 28b. An object having an uneven, saw-toothed forward edge surface 28c may be used as the vibrator 28a. Alternatively, instead of a saw, the forward edge surface 28c may be a brush or a comb.

Although the driving means 28b may be a vibrator, preferably the driving means 28b may be like an air cylinder that has a large stroke of several cm. In the present embodiment, the amplitude of the stroke in the second direction b is 30 mm, the cycle is 5 strokes/second, and the speed of leveling in the first direction a is 10 mm/sec, which can trim to a flat surface without unevenness in the leveled surface. In this instance, the speed in the second direction b is 300 mm/second, or 30 times the speed of 10 mm/second in the first direction a.

It should be noted that although the vibrator 28a is a plane and is disposed, in the embodiment shown in FIGS. 9 and 10, at an angle to the flat surface 11a, the vibrator 28a may be disposed parallel to the flat surface 11a. In the latter case, however, the excess powder A can only be carried away with difficulty, and therefore in such a case it is preferable that the vibrator 28a be shaped into the form of an L in cross-section, with the long vertical line thereof disposed perpendicular to the flat surface 11a, so as to carry away the excess powder A.

When the leveling means 28 moves in a first direction, it combines with the reciprocal movement in the second direction perpendicular to the movement in the first direction, and therefore it is possible that the leveling means 28 might lack sufficient power to remove any excess powder A, B from atop the empty space 11b. In such an instance, a c-direction swinging centered on the driving means 28b side of the leveling means 28 may be added, and can be accomplished by swinging the driving means 28b by a separate swinging movement means.

Figure 11:
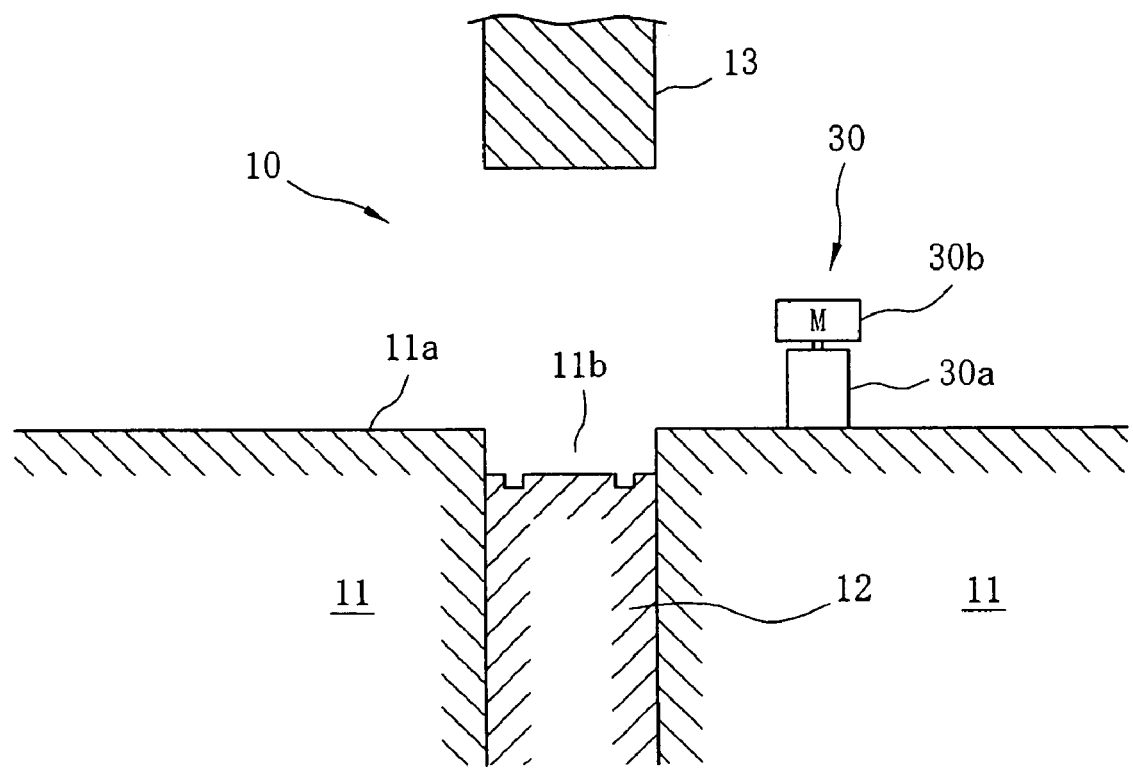
FIG. 11 is a diagram showing a longitudinal cross-sectional view of a powder leveling apparatus according to a fifth embodiment of the present invention.
Figure 12:
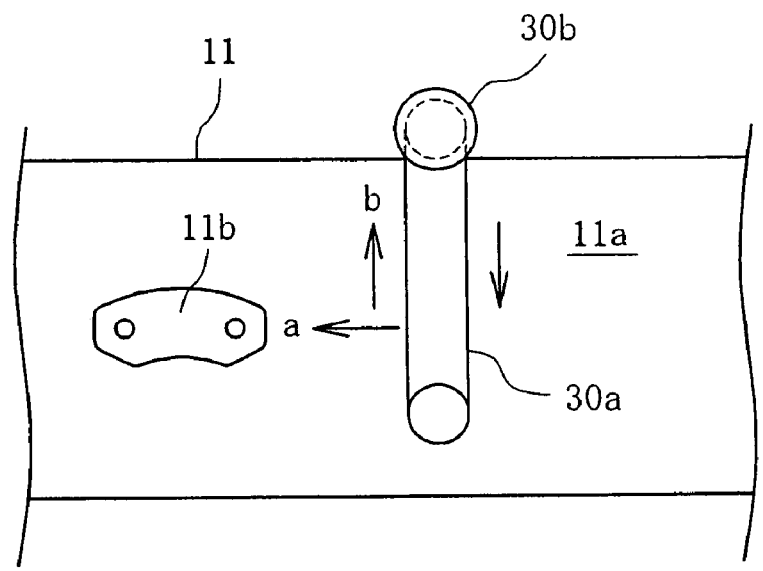
FIG. 12 is a diagram showing a plan view of the powder leveling apparatus according to the fifth embodiment.

FIG. 11 and FIG. 12 are diagrams showing a fifth embodiment of the present invention, in which FIG. 11 shows a longitudinal cross-sectional view and FIG. 12 shows a plan view thereof. The leveling means 30 of the present embodiment is comprised of a continuous belt 30a stretched between two pulleys, with a motor 30b mounted on one of the pulleys as a second-direction driving means. An edge of a bottom side of the continuous belt 30a contacts the flat surface 11a. Although not shown, by mounting the first direction driving means 15d and the rod 15e shown in FIG. 1 on the motor 30b, the leveling means 30 can be driven in the first direction indicated by arrow a. Of course, the first-direction driving means is not limited to such an arrangement.

When the empty space 11b is filled to overflowing with powder A and the motor 30b is rotated, the continuous belt 30a rotates in the second direction b. In such a state, driving the leveling means 30 in the first direction a with the first-direction driving means 15d causes the bottom of the continuous belt 30a to slide along the flat surface 11a so as to remove excess powder from atop the empty space 11b.

Figure 13:
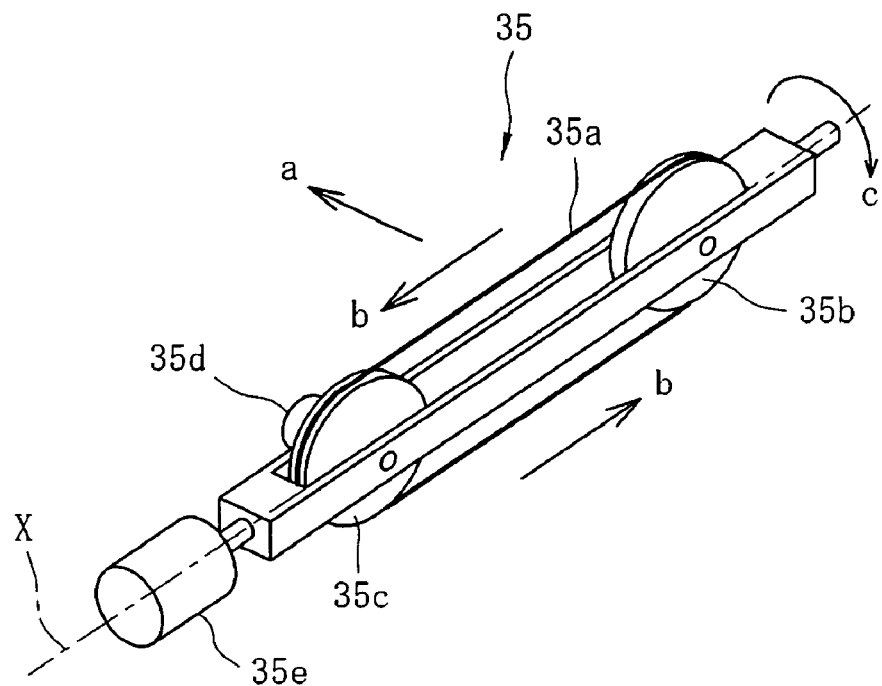
FIG. 13 is a diagram showing a perspective view of a powder leveling apparatus according to a sixth embodiment of the present invention.
Figure 14:
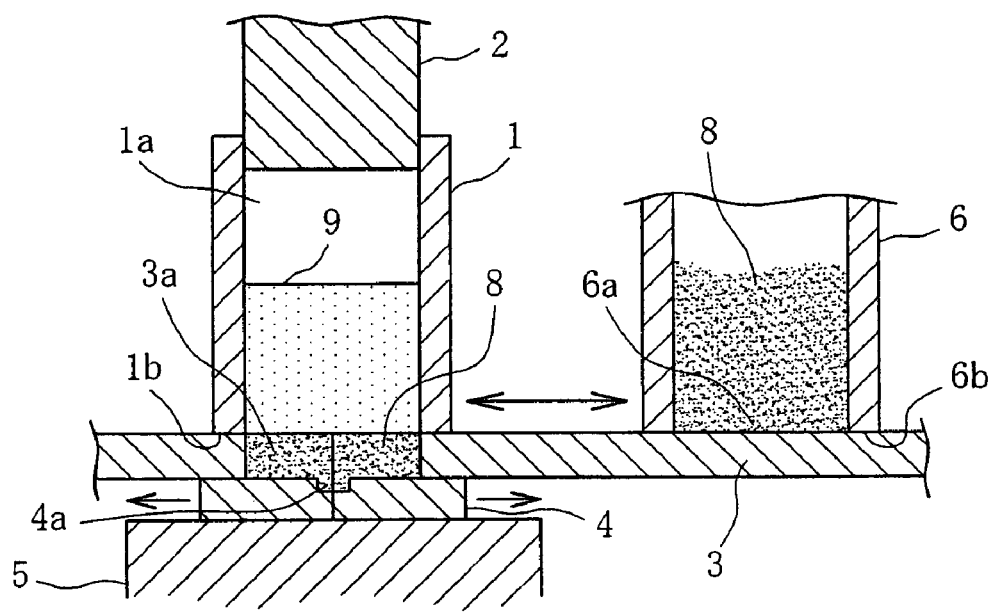
FIG. 14 is a diagram showing a conventional apparatus for production of friction material.

FIG. 13 is a diagram showing a perspective view of a sixth embodiment of the present invention. The leveling means 35 of this embodiment is comprised of a continuous line 35a wound between two pulleys 35b, 35c. When the motor 35d rotates, the continuous line 35a slides over the flat surface 11a so as to trim powder from atop the empty space 11b. It is preferable that the surface of the line 35a be rough, and may be rope made of twisted fiber.

Furthermore, in the present embodiment, additionally, a motor 35e rotates a frame that supports the two pulleys 35b, 35c so as to rotate the line 35a about a hypothetical line X connecting the centers of the two pulleys 35b, 35c (the line X being identical to the axis of rotation of the motor 35e). In the present embodiment, the motor 35d and the motor 35e together comprise the second-direction moving means. By adding rotation in the direction indicated by arrow c in FIG. 13, excess powder can be removed from atop the empty space 11b.

As described above, the powder leveling method and leveling apparatus of the present invention is suitable for the manufacture of brake, clutch or other friction material used in automobiles and other vehicles, and in particular to the production of multi-layered friction material consisting of multiple thin layers.

As many apparently widely different embodiments of the present invention can be made without departing from the spirit and scope thereof, it is to be understood that the invention is not limited to the specific preferred embodiments described above thereof except as defined in the claims.

What is claimed is:

1. A powder leveling method comprising the steps of:
    filling a cavity of predetermined shape with an opening in a flat surface with powder containing fiber so that the powder overflows the opening of the empty space in the flat surface;
    leveling the powder by moving a leveling means of which at least an edge portion of a bottom edge surface thereof is roughened in a first direction of movement over the empty space; and
    leveling the powder by moving the leveling means in a second direction of movement intersecting with the first direction of movement, at a speed greater than a speed with which the leveling means moves in the first direction of movement;
    wherein the leveling means includes a cylinder having a central axis perpendicular to the flat surface and a bottom edge surface of the cylinder slides over the flat surface; and
    wherein the second direction of movement is rotation of the cylinder about its axis.

2. The powder leveling method according to claim 1, wherein the inner diameter of the cylinder is greater than the empty space and the steps of leveling by the leveling means commence with entry of the empty space into the cylinder.

3. A powder leveling method comprising the steps of:
filling a cavity of predetermined shape with an opening in a flat surface with powder containing fiber so that the powder overflows the opening of the empty space in the flat surface;
leveling the powder by moving a leveling means of which at least an edge portion of a bottom edge surface thereof is roughened in a first direction of movement over the empty space; and
leveling the powder by moving the leveling means in a second direction of movement intersecting with the first direction of movement, at a speed greater than a speed with which the leveling means moves in the first direction of movement;
wherein the leveling means includes a vibrator; and
wherein the second direction of movement is reciprocal sliding of the vibrator over the flat surface.

4. A powder leveling method comprising the steps of:
filling a cavity of predetermined shape with an opening in a flat surface with powder containing fiber so that the powder overflows the opening of the empty space in the flat surface;
leveling the powder by moving a leveling means of which at least an edge portion of a bottom edge surface thereof is roughened in a first direction of movement over the empty space; and
leveling the powder by moving the leveling means in a second direction of movement intersecting with the first direction of movement, at a speed greater than a speed with which the leveling means moves in the first direction of movement;
wherein the leveling means includes a continuous belt, such that by rotation of the continuous belt, one edge of the belt slides over the flat surface to achieve the second direction of movement.

5. A powder leveling method comprising the steps of:
filling a cavity of predetermined shape with an opening in a flat surface with powder containing fiber so that the powder overflows the opening of the empty space in the flat surface;
leveling the powder by moving a leveling means of which at least an edge portion of a bottom edge surface thereof is roughened in a first direction of movement over the empty space; and
leveling the powder by moving the leveling means in a second direction of movement intersecting with the first direction of movement, at a speed greater than a speed with which the leveling means moves in the first direction of movement;
wherein the leveling means is a continuous line wound continuously between two separated pulleys and the second direction of movement involves rotating the continuous line about a hypothetical line connecting centers of the two pulleys while sliding the continuous line over the flat surface by rotating the two pulleys.

6. A powder leveling apparatus comprising:
a frame enclosing a cavity of a predetermined shape with an opening in a flat surface of the frame so that the powder overflows the opening of the empty space in the flat surface;
leveling means of which at least an edge portion of a bottom edge surface thereof is roughened so as to trim flush with the flat surface the powder poured into the empty space by moving the leveling means relative to the frame;
first movement means for leveling the powder by moving the leveling means or the frame in a first direction of movement over the empty space; and
second movement means for leveling the powder by moving the leveling means or the frame in a second direction of movement intersecting with the first direction of movement, at a speed greater than a speed with which the leveling means or the frame move in the first direction of movement;
wherein the leveling means includes a cylinder having a central axis perpendicular to the flat surface and a bottom edge surface of the cylinder slides over the flat surface; and
wherein the second direction of movement is rotation of the cylinder about its axis.

7. The powder leveling apparatus according to claim 6, wherein the inner diameter of the cylinder is greater than the empty space.

8. A powder leveling apparatus comprising:
a frame enclosing a cavity of a predetermined shape with an opening in a flat surface of the frame so that the powder overflows the opening of the empty space in the flat surface;
leveling means of which at least an edge portion of a bottom edge surface thereof is roughened so as to trim flush with the flat surface the powder poured into the empty space by moving the leveling means relative to the frame;
first movement means for leveling the powder by moving the leveling means or the frame in a first direction of movement over the empty space; and
second movement means for leveling the powder by moving the leveling means or the frame in a second direction of movement intersecting with the first direction of movement, at a speed greater than a speed with which the leveling means or the frame move in the first direction of movement;
wherein the leveling means comprises a cylinder having a central axis perpendicular to the flat surface and a disk inside the cylinder having an eccentric aperture therein, the disk sliding over the flat surface, the disk rotatable with the cylinder and movable within the cylinder by a predetermined distance along the central axis of the cylinder.

9. The powder leveling apparatus according to claim 6, wherein the central axis of the cylinder and the axis of rotation of the motor are eccentric.

10. A powder leveling apparatus comprising:
a frame enclosing a cavity of a predetermined shape with an opening in a flat surface of the frame so that the powder overflows the opening of the empty space in the flat surface;
leveling means of which at least an edge portion of a bottom edge surface thereof is roughened so as to trim flush with the flat surface the powder poured into the empty space by moving the leveling means relative to the frame;
first movement means for leveling the powder by moving the leveling means or the frame in a first direction of movement over the empty space; and
second movement means for leveling the powder by moving the leveling means or the frame in a second direction of movement intersecting with the first direction of movement, at a speed greater than a speed with which the leveling means or the frame move in the first direction of movement;

wherein the leveling means includes a vibrator one edge of which slides over the flat surface, the vibrator is provided on the second movement means for moving the leveling means in a second direction of movement, and wherein the second movement means for moving the leveling means in the second direction of movement moves the vibrator reciprocally.

11. A powder leveling apparatus comprising:

a frame enclosing a cavity of a predetermined shape with an opening in a flat surface of the frame so that the powder overflows the opening of the empty space in the flat surface;

leveling means of which at least an edge portion of a bottom edge surface thereof is roughened so as to trim flush with the flat surface the powder poured into the empty space by moving the leveling means relative to the frame;

first movement means for leveling the powder by moving the leveling means or the frame in a first direction of movement over the empty space; and second movement means for leveling the powder by moving the leveling means or the frame in a second direction of movement intersecting with the first direction of movement, at a speed greater than a speed with which the leveling means or the frame move in the first direction of movement;

wherein the leveling means is a continuous belt wound continuously between two separated pulleys so as to slide over the flat surface and the second means for moving the leveling means in the second direction of movement involves rotating the pulleys.

12. A powder leveling apparatus comprising:

a frame enclosing a cavity of a predetermined shape with an opening in a flat surface of the frame so that the powder overflows the opening of the empty space in the flat surface;

leveling means of which at least an edge portion of a bottom edge surface thereof is roughened so as to trim flush with the flat surface the Powder poured into the empty space by moving the leveling means relative to the frame;

first movement means for leveling the powder by moving the leveling means or the frame in a first direction of movement over the empty space; and second movement means for leveling the powder by moving the leveling means or the frame in a second direction of movement intersecting with the first direction of movement, at a speed greater than a speed with which the leveling means or the frame move in the first direction of movement;

wherein the leveling means is a continuous line wound continuously between two separated pulleys so as to slide over the flat surface and the second means for moving the leveling means in the second direction of movement rotates the continuous line about a hypothetical line connecting centers of the two pulleys while rotating the pulleys.

13. The powder leveling apparatus according to claim 6, wherein the frame comprises press molding apparatus frame molds and a lower mold movable between and relative to the frame molds, and wherein the depth of the empty space being adjustable by changing the relative height of the frame molds and the lower mold.

* * * * *